March 9, 1954
W. GORDON
2,671,482
QUICK-ACTING SCREW AND RATCHET CLAMPING DEVICE
Filed Jan. 3, 1949
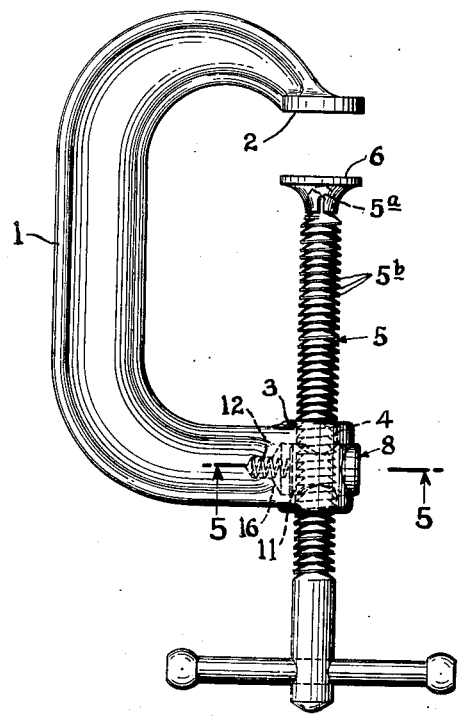
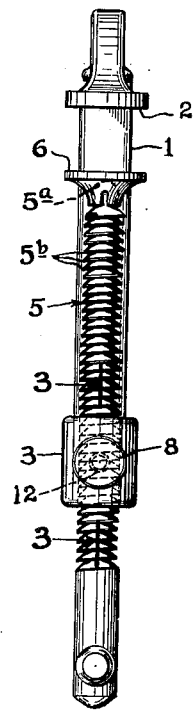
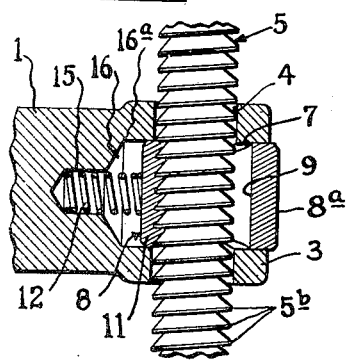
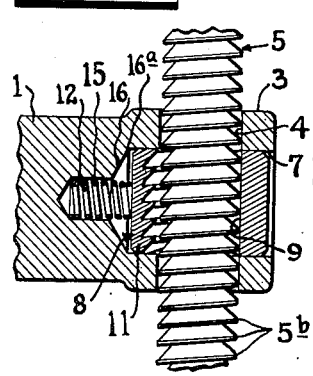
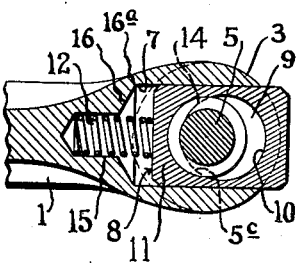
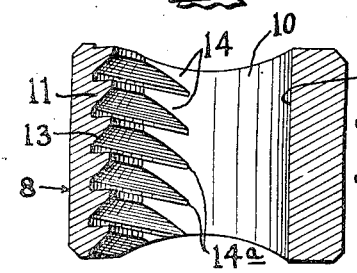
INVENTOR.
WILLIAM GORDON
BY
Joseph F. O'Brien
ATTORNEY Patented Mar. 9, 1954

2,671,482

UNITED STATES PATENT OFFICE 2,671,482

QUICK-ACTING SCREW AND RATCHET CLAMPING DEVICE

William Gordon, Union City, N. J.

Application January 3, 1949, Serial No. 68,881

1 Claim. (Cl. 144—305)

This invention relates to improvements in quick-acting screw and ratchet clamping devices.

In quick-acting screw-and-ratchet clamps the clamping member comprises a frame member with a work-engaging arm at one terminal arranged in registration with a screw-bearing arm or jaw at the other terminal. The screw-bearing arm is provided with a longitudinal smooth screw-guiding and retaining bore through which a clamping or pressure-applying screw is adapted to pass coaxially and to be movable into contact with a piece of work between the end of the screw and the work-engaging terminal arm. A cylindrical transverse recess or bore is formed in the screw-bearing arm which traverses the longitudinal screw-guiding bore and a spring-pressed cylindrical nut is movably mounted in said transverse bore and provided with a nut bore or hole having a smooth-wall portion and a sectional screw-thread forming a ratchet for meshing-engagement when pressed by a spring with the threads of the screw passing through the longitudinal screw-guiding bore in the bearing arm, thus enabling a clamping of work-pieces between the capped end of the screw and the work-engaging arm and permitting disengagement of the sectional threads from such threads of the screw upon manual operation of the finger-engageable extension to release the screw from its clamping engagement.

It has been customary heretofore to include in such a nut-bore a threaded portion or ratchet of full depth threads on one-half of an initial circular ratchet bore and to provide eccentrically of said initial bore a smooth-wall bore portion of much greater area. In making such partly threaded and partly-smooth bores, a threaded bore corresponding in diameter with the screw and adapted to mesh with the threads thereof is initially formed and one-half of the threads of this threaded bore are then sharply cut away to provide a smooth bore portion and to leave a ratchet portion comprising the other half of the threads. In this cutting away operation, the smooth-wall portion is necessarily of greater area than the threaded portion to enable, upon movement of the nut, complete separation of the threads on the threaded half from the threads of the screw. A relatively long cylindrical nut is thus required to enable such initial boring and threading, and the subsequent cutting away of half of the threads which is usually done by another boring tool.

It is desirable to utilize as large a screw as is possible in a given bearing arm, and, as the space is very limited, a large increase of the length of the transverse bore beyond the diameter of the screw-guide bore in such bearing which is necessary for the accommodation of such long nut and the actuating spring therefor badly weakens the bearing. In order to avoid this weakening, it was heretofore necessary to reduce the diameter of the screw and it was also suggested that, for reception of the spring, an additional eccentric bore communicating circumferentially with the screw-passing bore in the nut be provided.

One of the objects of my invention is to enable utilization in a bearing of given diameter of a nut of minimum and reduced length with a nut-mounting bore of reduced proportion, and to provide in a nut of given size, means for engaging and disengaging screws of increased diameter, and with this end in view I utilize in the sectional nut a screw-threaded ratchet composed of thread-sections of two varying depths, one of said thread-sections being a middle section of full-depth threads and the other thread-sections comprising end thread-sections gradually tapering from the full-depth middle section to an apex merging with the smooth wall of the disengaging bore.

Another object of my invention is not only to enable a shortening to minimum length of the nut but also to provide more ready entrance channels between the threads of the screw and the full-depth threads of the ratchet which facilitated the entrance of the screw threads of the screw to said sectional screw-threads of the nut, thus resulting in a more facile meshing action between the threads of the screw and the threads of the sectional nut.

Still another object of my invention is in a nut of such minimum length to provide at the axis of the transverse nut-mounting bore a spring-retaining bore of small diameter which will enable effective housing of a strong and effective spring while in no way weakening the bearing arm.

Still another object of my invention is to provide between the spring bore and the nut bore a tapering chamber of frusto-conic conformation which will function both as a stop for the inward movement of the nut and a tapering guide opening from said nut-mounting bore into the spring bore to enable more ready access thereto in the mounting of the spring therein.

Another object of my invention is to employ on the screw and ratchet buttress threads and to slightly undercut the screw-threads and the full-depth ratchet threads for the purpose of causing the ratchet, when the screw is under clamping stress, to provide a more secure interengaging meshing with the threads of the screw and consequently producing a more efficient ratchet-clamp, and in threads of buttress type I also preferably flatten or blunt the edges of the threads of the screw to avoid brittleness thereof, and shape the ratchet threads similarly.

With these and other objects in view, the invention comprises the combination of members and arrangement of parts so combined as to coact and cooperate with each other in the performance of the functions and the accomplishment of the results herein contemplated, and comprises in one of its adaptations the species or preferred form illustrated in the accompanying drawings, in which Fig. 1 is a view in a side elevation of a ratchet screw clamp embodying my invention;

Fig. 2 is a view in front elevation of the clamp shown in Fig. 1;

Fig. 3 is a section on the line 3—3 of Fig. 2 looking in the direction of the arrows and showing the sectional nut and screw in engaged position;

Fig. 4 is a view similar to Fig. 3 showing the sectional nut and screw in disengaged position;

Fig. 5 is a section on the line 5—5 of Fig. 1 looking in the direction of the arrows; and Fig. 6 is a longitudinal axial section of the nut removed from its bore and illustrating in section the full depth thread and in elevation showing the gradually-tapering end portions which merge into and with the smooth wall of the thread-eliminating bore portion.

Referring now to these drawings which illustrate a preferred embodiment of my invention, 1 indicates a conventional clamp body or frame member of substantially C-shape having a work-engaging arm or jaw 2 at one terminal that is arranged in registration with a screw-bearing arm or jaw 3 at the other terminal. In this ratchet type of C-clamp, the screw-bearing arm 3 is provided with a longitudinal, smooth screw-guiding-and-retaining bore 4 through which a clamping or pressure applying screw 5 is adapted to pass coaxially and to be movable into contact with a piece of work between a ball-shaped end 5a of the screw and the work-engaging terminal arm or jaw 2. The end 5a is usually provided with a conventional cap 6 having a socket fitting over the ball-shaped end 5a of the screw. The walls of the cap socket are usually kerfed to allow contraction and when positioned on the ball-shaped end are squeezed on the end of the screw so to mount the cap 6 as to have a rocking movement on the end 5a.

In these ratchet clamps, a cylindrical transverse nut-holding recess or bore 7 is formed in the screw-bearing arm 3 which traverses the longitudinal screw-guiding bore 4 and a spring-pressed cylindrical nut 8 is slidably mounted in said transverse nut-holding bore. The nut 8 is provided with a screw-receiving bore or hole 9 having a smooth-wall portion 10 and a sectional screw-threaded portion 11 forming a ratchet for intermeshing-engagement, when pressed by a spring 12, with the threads 5b of the screw 5 passing through the longitudinal screw-guiding bore 4 in the bearing arm 3.

Prior art C-shaped screw-and-ratchet clamps have always heretofore included in such a nut-holding bore 9 a threaded portion or ratchet comprising semi-circumferential full depth threads occupying a complete one-half of the circumference of an initial screw-threaded circular ratchet bore. These semi-circumferential full-depth threads were adapted to engage half the circumference of the screw-threads of the screw and were apparently thought necessary to procure an efficient screw-threaded ratchet. To procure such semi-circumferential full-depth threads in such prior art devices a smooth-wall disengaging bore, connected circumferentially with said initially-formed screw-threaded bore, but of much greater radius or diameter than the threaded portions was necessarily formed and with such a semi-circumferential ratchet a relatively large or long movement of the nut and its threads in relation to the threads of the screw was necessary to procure complete separation of such threads on the threaded half of the initial bore from said threads of the screw. Such connected bores in the nut and the required movement of the nut necessitated an elongated nut and, of course, when such a long cylindrical nut is employed it is necessary to utilize a long nut-holding bore in the bearing or jaw 3.

It is desirable to utilize as large a screw as possible in the bearing arm 3, and as the space within this arm is very limited, an increase of the length of the transverse nut-holding bore across the diameter of the screw-guiding bore, which is necessary for the accommodation of a long nut, weakens the bearing. Add to this long nut-holding bore a spring-housing bore for the necessary spring and the walls of a conventional bearing would be further weakened. Heretofore, in order to avoid such weakening, the diameter of the screw that could be used was limited and it was also suggested that for the reception of the nut-actuating spring, an additional necessary bore should be arranged eccentrically of the nut-holding bore and should communicate therewith circumferentially.

In accordance with my present invention, I am enabled to largely reduce the length of the necessary engaging and disengaging movements and also the length of the nut and the length of the nut-mounting or holding bore, and in a nut of given size I provide an efficient ratchet by which engagement and disengagement of the ratchet threads from the screw threads may be accomplished in a very short movement, and consequently I am enabled to greatly reduce the size of the nut itself as well as the transverse nut-mounting bore in the bearing and the screw-passing bore through said nut, and as a consequence of this space-saving in the bearing, larger screws may be used in a bearing of given size. In accordance with my said invention, I utilize in the sectional nut a screw-threaded ratchet composed of ratchet sections having threads of varying depths, one of said sections being a middle section 13 having full-depth threads and the other section comprising end sections 14 having threads which gradually taper from the full depth threads of the middle section to an apex 14a which merges with the smooth wall portion 10 of the disengaging bore. To procure a smooth wall bore of this type I provide a boring tool of only slightly larger diameter or radius than the boring tool used for the initial threaded bore and instead of cutting the threads transversely at half or semi-circumference thereof, I cut away tapering portions of the semi-circumferential ratchet and thus leave the oppositely tapering end sections 14 at opposite ends of the middle full-depth thread-sections 13. While this ratchet formation leaves a small tapered section 5ᶜ of the screw which is not engaged I find that the use of tapered end sections 14, 14 together with the full depth threads 13 not only provide a sufficient and efficient engagement, but said end sections 14 form guiding channels to permit more ready engagement of the nut and screw on the screw-engaging movements of the nut into engaging position, and, of course, as hereinbefore indicated, greatly reduces the length and area of the bore 9 and enables for a given screw a shorter nut to be employed.

In accordance with my invention, I also connect a spring-housing bore 15 axially with the nut-mounting bore 9. This is accomplished, first, by extending said nut-mounting bore 7 from the front of the bearing 3 across the axis to the rear thereof, and, secondly, by reducing the diameter of the spring-housing bore to a minimum and extending the same into the clamp-body of frame 1. Plenty of room for a spring-housing bore 15 of small diameter that will house therein a spiral spring 12 which will engage the axis of the nut is thus provided, and I find that this spring 12 will be sufficiently powerful to engage the slidable nut axially and to move the same so as to securely force the threads of the ratchet into engagement with the threads of the screw. Such an extension of the spring-housing bore 15 may thus be provided in the body of the C-clamp without in any way weakening the construction thereof. The spring-housing bore 15 is preferably connected with the nut-mounting bore 9 by frusto-conic chamber 16. This chamber 16 provides a guiding wall to permit ready entrance of the spring 12 into the bore 15 and the upper edge 16ᵃ thereof will form a stop for the inward movement of nut 8 during manual operation thereof.

In quick-acting screw and ratchet-clamps, screws of buttress type have heretofore been employed to enable a more facile passage of the screw through its bore in a ratchet and pawl movement without manual operation for release of the ratchet in the sectional nut from the screw threads. In such a buttress type screw, the load-resisting side of the thread is straight or at a right angle to the axis while the opposite side is inclined at an angle of 45 degrees.

In ratchets generally it is desirable, in order to prevent accidental release under stress, to undercut the teeth, but in ratchet clamps having nuts provided with ratchet portions of screw threads of full depth on half the circumference of the threaded bore it was impossible to undercut the ratchet threads because of the difficulty in meshing. In accordance with my present invention I am enabled to undercut the full-depth threads 13 slightly, as more particularly shown in Fig. 6, and these undercut threads of the ratchet are adapted to mesh with undercut threads of a screw 5. Such undercutting provides a more secure intermeshing engagement with the threads of the ratchet and screw and consequently a more efficient ratchet clamp. Of course, such an undercutting causes the manual operation necessary for disengagement to require more manual pressure because the screw is necessarily moved slightly in an axial direction before disengagement and while the screw is not under clamping stress, but I find that the use of such undercut threads on the ratchet and screw will, when the screw is under clamping stress, enable a much more secure intermeshing engagement than otherwise; and in the preferred embodiment of my invention I utilize such undercut threads notwithstanding the requirement of greater manual pressure in said releasing operation.

My sectional ratchet is adapted to cooperate with any type of screw and in all cases the screw may be readily, quickly and easily released for quick operation by pressing down by the finger of the user on the outer surface of the nut. Such pressure will compress the spring 12 and move the threads of the sectional nut away from the screw, whereupon the screw may be freely moved in any direction instead of the slow manual screwing necessary on C-shaped clamps of the continuous thread type.

The operation of my device will be clear from the foregoing description and it will only be necessary to state that when my improved screw bearing is used with conventional screws, finger pressure upon the surface 8ᵃ will release the screw from engagement with the screw-threaded ratchet 11 and the screw may be then moved in either direction through the guiding bore 4 in the bearing 3. When, however, my improved screw bearing is employed with an undercut screw of the type shown in Figs. 1 and 2 in which the threads have an upward and inward inclination and the threads of the sectional nut have a complementary pitch, it will be seen that the threads 13 and 14 of the sectional nut will, by a pressure of the spring 12, be forced into intermeshing engagement with the threads of the screw as the inclinations of the threads of the screw and the threads of the threaded sectional nut are such that the spring pressed sectional nut will act like a pawl to permit movement in one direction so that with screws of this type direct manual pressure on the crew or on the handle thereof in an inward direction will cause an automatic releasing or disengagement of the threads of the sectional element from the threads of the screw, and the threads of the screw will click thereover as if the threads of the sectional nut where a pawl so as to enable the screws to be moved quickly, and without operation of the sectional nut, to approximate work-clamping position. When such approximate position is reached a short turn on the screw handle of approximately a quarter of a revolution will enable a tightening up of the screws on the work. When so tightened the sectional nut becomes set and cannot be operated manually until given a short releasing turn. This setting or locking of the sectional nut is due to the tight frictional engagement of the intermeshing threads when the screw is in clamping engagement with a piece of work. When, however, the threads are undercut as hereinabove described an increased tightening will be accomplished so that it will be absolutely impossible, when the screw is in clamping engagement with a piece of work, to release the same.

Having described my invention, I claim:

A quick-acting screw-and-ratchet clamping device comprising a C-shaped clamp body formed of channel-shaped material having at one terminal a cylindrical screw-mounting bearing provided with a smooth-walled screw-guiding bore, a clamping screw provided with buttress threads fitted snugly in said bore and having at one end an operating handle and at the other end a clamping terminal, a transverse nut-mounting bore of cylindrical shape extending from the front surface portion of said bearing across said screw-guiding bore toward and into alignment with said clamp body, a cylindrical sectional nut member mounted to slide transversely in said transverse nut-mounting bore and having an operating portion extending to the front surface of said cylindrical bearing, said sectional nut member having a screw-receiving bore through which said screw passes and being provided internally with a ratchet portion adapted to engage with the threads of said screw and also provided with a crescent-shaped smooth wall portion having its widest portion of slightly greater diameter than the diameter of the screw threads of the ratchet portion, said ratchet portion comprising a middle section having full-depth female buttress threads and bevelled end sections extending between said middle section and said smooth wall portion and having threads of gradually reduced depth, said bevelled end sections being provided with thread portions, each having one side gradually tapering toward the other side and merging in a sharp apex at the junction between said bevelled end sections and said smooth wall portion, a spring-housing bore formed in said channel-shaped clamp body and being connected axially with said transverse nut-mounting bore, and a spring arranged in said spring-housing bore and having one end pressing against said sectional nut and the other abutting the bottom of said spring-housing bore for applying pressure against said nut member to move the ratchet threads thereof into intermeshing engagement with the threads of said screw, the threads of said screw and the full depth buttress-type threads of said ratchet having the load-resisting side thereof slightly undercut beyond a right angle to the axis while the opposite side of the thread is inclined at substantially 45°, as and for the purpose set forth.

WILLIAM GORDON.

References Cited in the file of this patent
UNITED STATES PATENTS

| Number | Name | Date |
|---|---|---|
| 150,900 | Silver et al. | May 12, 1874 |
| 667,277 | Williams | Feb. 5, 1901 |
| 856,436 | Walden | June 11, 1907 |
| 924,122 | Williams | June 8, 1909 |
| 1,564,465 | Bretherton et al. | Dec. 8, 1925 |
| 2,430,458 | Farrell | Nov. 11, 1947 |
| 2,643,263 | Gordon | Mar. 1, 1949 |